US011976512B2

(12) United States Patent
Glover

(10) Patent No.: US 11,976,512 B2
(45) Date of Patent: May 7, 2024

(54) CURTAIN WALL DRAINAGE VENT

(71) Applicant: ARCONIC TECHNOLOGIES LLC, Pittsburgh, PA (US)

(72) Inventor: Raymond Glover, Weaverham Northwich (GB)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 7 days.

(21) Appl. No.: 17/553,975

(22) Filed: Dec. 17, 2021

(65) Prior Publication Data

US 2022/0228428 A1 Jul. 21, 2022

(30) Foreign Application Priority Data

Jan. 15, 2021 (EP) .................................... 21151787

(51) Int. Cl.
*E04D 1/30* (2006.01)
*E04B 2/96* (2006.01)
*E06B 7/14* (2006.01)

(52) U.S. Cl.
CPC .................. *E06B 7/14* (2013.01); *E04B 2/96* (2013.01); *E04D 1/30* (2013.01); *E04D 2001/308* (2013.01); *E06B 2007/145* (2013.01)

(58) Field of Classification Search
CPC ......... E06B 7/14; E06B 2007/145; E04B 2/96
See application file for complete search history.

(56) References Cited

U.S. PATENT DOCUMENTS 1,348,562 A * 8/1920 Hauser .................... F16K 15/03 137/527.8
2,093,515 A * 9/1937 Filkins ................ E04D 13/0431 137/527.6
2,203,753 A * 6/1940 Strandt ..................... E06B 7/14 49/408
2,772,648 A * 12/1956 De Persia ............... B63B 13/00 114/185
2,787,034 A * 4/1957 Hauck ....................... E06B 7/14 52/846
2,827,674 A * 3/1958 Hanck ....................... E06B 7/14 16/374

(Continued)

FOREIGN PATENT DOCUMENTS

CN 217150711 U * 8/2022 ........... F16K 15/183
EP 2434081 A1 3/2012
WO WO-2010120200 A1 * 10/2010 ........... F16K 15/183

OTHER PUBLICATIONS https://www.lowes.com/pd/PVC-Pipeworks-1-in-x-1-in-x-1-in-x-1-in-x-1-in-dia-Side-Outlet-Elbow-Tee-PVC-Fitting-4-Pack/1001731046 (Year: 2023).*
Extended European Search Report dated Jun. 21, 2021 for EP Application No. 21151787.5.

* cited by examiner

*Primary Examiner* — Phi D A
(74) *Attorney, Agent, or Firm* — Vorys, Sater, Seymour and Pease, LLP

(57) ABSTRACT

A curtain wall for a building comprising: a frame anchored to the building and including a plurality of frame units; infill panels, which are supported by the frame units and at least partially define an outer face of the curtain wall; wherein the curtain wall comprises at least one drainage vent for venting fluid from inside the curtain wall to outside the curtain wall, the drainage vent comprising a fluid flow path, wherein an opening for the fluid flow path is provided in the outer face of the curtain wall.

18 Claims, 7 Drawing Sheets

(56) References Cited

U.S. PATENT DOCUMENTS

| | | | | |
|---|---|---|---|---|
| 3,466,819 | A * | 9/1969 | Giger | E06B 7/14 52/204.597 |
| 3,565,099 | A * | 2/1971 | Huber | F16K 5/0407 137/527.8 |
| 3,849,938 | A * | 11/1974 | Thompson | E06B 7/14 49/471 |
| 3,919,815 | A * | 11/1975 | Alabaster | E06B 1/02 52/209 |
| 4,003,171 | A * | 1/1977 | Mitchell | E06B 7/14 49/408 |
| 4,217,846 | A * | 8/1980 | Wight | B63B 13/00 137/533.11 |
| 4,691,487 | A * | 9/1987 | Kessler | E06B 7/14 454/227 |
| 5,123,212 | A * | 6/1992 | Dallaire | E06B 7/14 49/408 |
| 5,822,934 | A * | 10/1998 | O'Donnell | E06B 7/14 52/214 |
| 5,890,331 | A * | 4/1999 | Hope | E06B 3/5892 52/204.52 |
| 5,956,909 | A * | 9/1999 | Chou | E06B 7/2316 52/302.1 |
| 6,374,557 | B1 * | 4/2002 | O'Donnell | E06B 7/14 49/408 |
| 8,112,860 | B2 * | 2/2012 | Collins | E06B 3/677 52/786.13 |
| 8,458,968 | B2 * | 6/2013 | Shoshan | E06B 3/4636 52/302.6 |
| 8,584,411 | B2 * | 11/2013 | Mitchell | E06B 7/14 52/302.1 |
| 8,683,747 | B2 * | 4/2014 | Kim | E06B 7/14 49/404 |
| 9,359,811 | B2 * | 6/2016 | Hughes | E06B 1/702 |
| 10,087,678 | B2 * | 10/2018 | Pettibone | E06B 1/702 |
| 10,753,085 | B2 * | 8/2020 | Privan | E06B 7/14 |
| 10,961,769 | B2 * | 3/2021 | Vos | E06B 1/62 |
| 2018/0163458 | A1 * | 6/2018 | Header | E06B 3/362 |

CURTAIN WALL DRAINAGE VENT

TECHNICAL FIELD

The present disclosure generally relates to curtain walls for buildings and, more specifically, to a drainage vent for curtain walls and to a curtain wall comprising one or more of the drainage vents.

BACKGROUND

A curtain wall is an outer covering of a building that spans multiple floors. A curtain wall is non-load bearing in that it does not carry the structural load of the building, other than its own dead weight. As curtain walls are non-load bearing, they may be fabricated from lightweight materials to reduce construction costs. Curtain walls may be designed to keep weather out by resisting air and water infiltration into the building. Furthermore, curtain walls may be designed to accommodate thermal expansion and contraction, and to absorb building sway induced by wind and/or seismic forces. Loads that are imposed on a curtain wall may be transferred to the building through floor anchors that connect the curtain wall to the floor structures of the building.

A curtain wall may be composed of a frame formed from a plurality of horizontal and vertical members. The horizontal and vertical members of the frame may connect to form frame units that receive infill panels of an infill material such as glass, metal, or stone veneer. The vertical members of the frame may be formed from vertical mullions, and the horizontal members of the frame may be formed from transoms or horizontal mullions. The vertical mullions and the horizontal mullions may be formed from a lightweight material, such as extruded aluminum. The vertical and horizontal mullions may assemble with gaskets and pressure plates to create a glazing pocket configured to capture and form a seal with the infill panels.

Curtain walls may be characterized as “mullion drained” in which water drainage and ventilation may occur in grooves along the face of the vertical mullions. By contrast, in “zone drained” curtain walls, each infill panel may drain individually so water cannot drain along the lengths of the mullion. In addition, curtain walls may be characterized as “stick” or “unitized” systems. In stick systems, assembly of the frame and glazing (installation of the infill panels) may performed on-site, whereas in unitized systems, frame assembly and glazing is performed at a factory and the fully assembled curtain wall is subsequently erected on the building.

It is to be noted that the drainage systems are important not only since they drain water but since they provide ventilation. The ventilation allows for pressure equalization of the curtain walls. However, opportunities for pressure equalization are limited in the prior art arrangements as discussed. In all of these arrangements, ventilation by the drainage systems may only occur at the head and cill of the curtain wall, i.e. air can only enter/exit the curtain wall at the head and cill. With limited opportunity for pressure equalization there is a physical limit to the possible size of curtain walls constructed according to the principles of the prior art.

The present invention arose in a bid to provide an improved curtain wall that, whilst cost-effective, would not be limited in size.

SUMMARY

According to a first aspect, there is provided a curtain wall for a building comprising: a frame anchored to the building and including a plurality of frame units; infill panels, which are supported by the frame units and at least partially define an outer face of the curtain wall, wherein the curtain wall comprises at least one drainage vent for venting fluid from inside the curtain wall to outside the curtain wall, the drainage vent comprising a fluid flow path, wherein an opening for the fluid flow path is provided in the outer face of the curtain wall.

The curtain wall may comprise an upper edge and a lower edge, in which case the opening is preferably provided intermediate the upper edge and the lower edge.

The frame units may comprise horizontal members and vertical members. The vertical members may comprise vertical mullions. The horizontal members may comprise horizontal mullions or transoms. The drainage vent may be provided at or adjacent to a junction of one of the vertical members with one or more of the horizontal members. The frame members, comprising horizontal and vertical members or otherwise, may additionally or alternatively comprise glazing support members.

The vertical members may comprise drainage channels.

Preferably one or more drainage seals may be provided for sealing between the drainage vent and one or more of the frame units. More preferably, where the frame units comprise horizontal and vertical members, the one or more drainage seals may seal between the drainage vent and one or more of the horizontal and/or vertical members. Most preferably, when the drainage vent is provided at the junction between one of the vertical members and one or more of the horizontal members, the one or more drainage seals are configured to seal between the drainage vent, the vertical member and one or more of the horizontal members.

The drainage vent may project from the outer face of the curtain wall. The drainage vent preferably comprises a spout that projects through the opening. More preferably, the spout projects to a point beyond an outer face of one or more of the infill panels.

The drainage vent may comprise an open top. The open top may comprise a recess, which is in fluid communication with the fluid flow path. The recess may comprise a trough.

The fluid flow path preferably extends between a first opening inside the curtain wall and a second opening.

A valve is preferably provided for controlling fluid flow through the fluid flow path. The valve is preferably configured to be normally open to permit the flow of water and/or air through the flow path in a first direction between the first opening and the second opening and to permit the flow of air through the flow path in an opposed second direction between the second opening and first opening. The valve is preferably configured to close as a result of fluid pressure in the second direction and to thereby prevent the flow of fluid through the flow path in the second direction. The valve may comprise a flap valve or a ball valve.

Preferably, the frame units comprise slots and the drainage vent comprises one or more projections extending therefrom for receipt by the slot(s) for locating the drainage vent. The projections may comprise tabs. More preferably, when the frame units comprise vertical members and horizontal members, the drainage vent may comprises a first projection for engaging a slot in one of the vertical members and one or more second projections for engaging slot(s) in one or more of the horizontal members. It may be, when the frame members comprise glazing support members, that one or more of the slots is provided in one or more of the glazing support members.

The curtain wall preferably comprises a plurality of the drainage vents.

In a further aspect, there is provided a drainage vent for use in the curtain wall as defined in any of the above statements.

In a yet further aspect, there is provided a drainage vent, which comprises a flow path.

The drainage vent may comprise an open top. The open top may comprise a recess in fluid communication with the flow path. The recess may comprise a trough.

The drainage vent preferably comprises a spout. The spout may be arranged to project through an opening provided in an outer face of a curtain wall, most preferably to a point beyond an outer face of one or more infill panels of the curtain wall.

A valve is preferably provided for controlling fluid flow through the fluid flow path of the drainage vent. The valve is preferably configured to be normally open to permit the flow of water and/or air through the flow path in a first direction between a first opening and a second opening and to permit the flow of air through the flow path in an opposed second direction between the second opening and first opening. The valve is preferably configured to close as a result of fluid pressure in the second direction and to thereby prevent the flow of fluid through the flow path in the second direction. The valve may comprise a flap valve or a ball valve.

Preferably the drainage vent comprises one or more projections extending therefrom for locating the drainage vent in use. The projections may comprise tabs.

These and other aspects and features of the present disclosure will be more readily understood when read in conjunction with the accompanying drawings. Moreover, it must be noted that the various features of any of the above statements may be combined without restriction, as will be readily appreciated by those skilled in the art.

DETAILED DESCRIPTION

Figure 1:
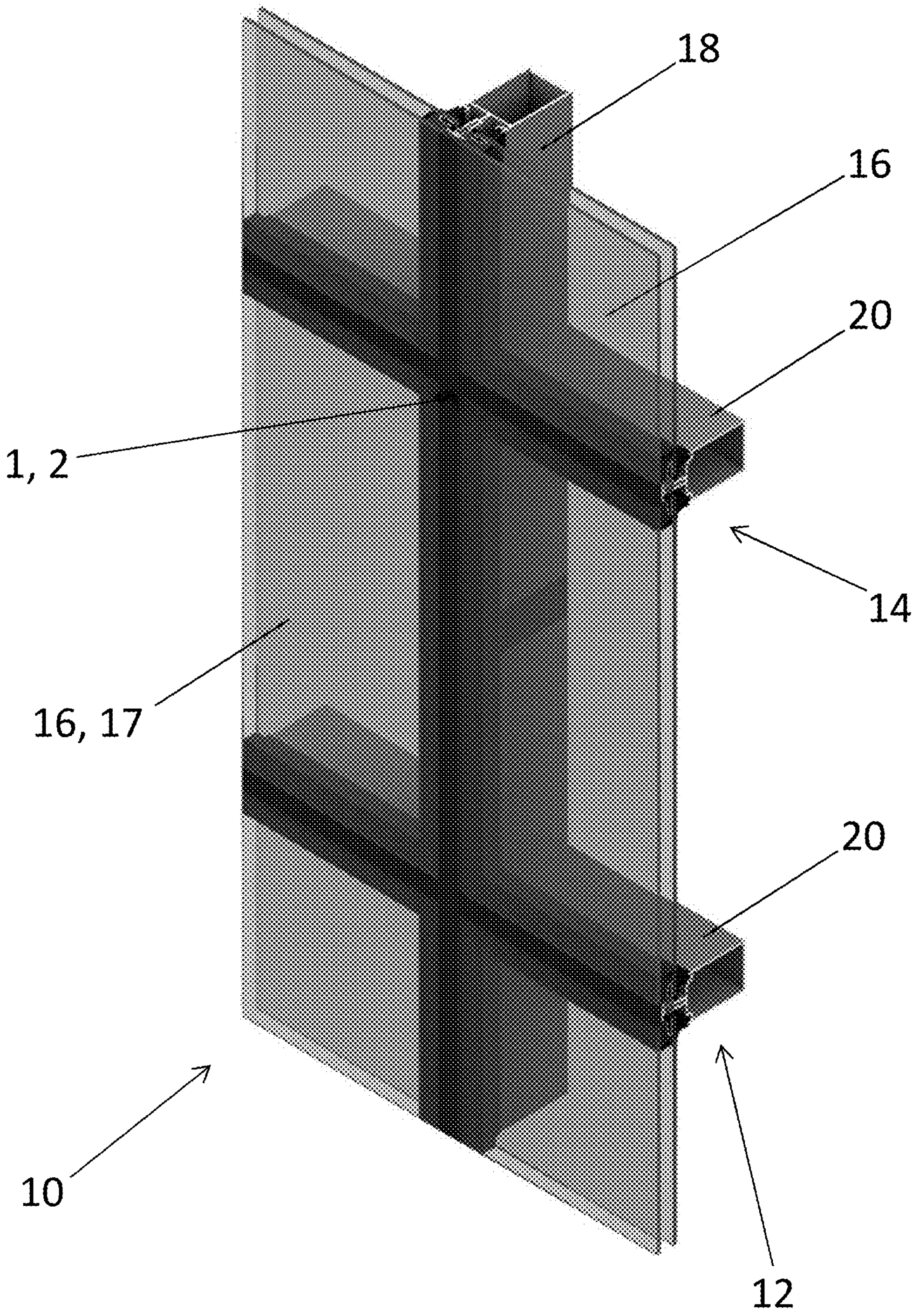
FIG. 1 is a front perspective view of a section of an exemplary curtain wall in accordance with the present disclosure that comprises one or more drainage vents with a single drainage vent visible.

Referring now to the drawings, and with specific reference to FIG. 1, a section of a curtain wall 10 oriented for attachment to a building is shown. The curtain wall 10 may provide an outer covering for a building. As is understood by those with ordinary skill in the art, the curtain wall 10 may provide a weather barrier that resists air and/or water infiltration into the building. It may further absorb building sway caused by various forces acting on the building.

The curtain wall 10 includes a frame 12 for anchoring to the building. It may, for example, be anchored to floor structures of the building. The frame 12 comprises a plurality of frame units 14 that support infill panels 16. The infill panels 16 at least partially define an outer face 17 of the curtain wall 10, as, for example, clearly shown in FIG. 1. In the partial view of FIG. 1 portions only of six frame units 14 and six infill panels 16 are shown. It should be appreciated that curtain walls according to the principles of the present disclosure may comprise any desired number of frame units/infill panels. The infill panels 16 may be panels of an infill material such as, but not limited to, glass, metal, or stone veneer. The infill panels shown in FIG. 1 comprise glass and the curtain wall is a silicon structural glazing (SSG) system. The frame 12 may be composed of a plurality of vertical members 18 and horizontal members 20 that interconnect to form the frame units 14, as shown. The vertical members 18 may include vertical mullions, and the horizontal members 20 may include horizontal mullions/transoms. The vertical mullions and the horizontal mullions may be formed from a lightweight material such as, but not limited to, extruded aluminum. It should be noted that curtain walls according to the principles of the present disclosure need not be limited to arrangements that comprise horizontal and vertical members. Arrangements will be possible, for example, in which frame members are provided at an oblique angle to one another and/or in which the infill panels are other than co-planar to one another.

The curtain wall 10 comprises at least one drainage vent 1 for venting fluid from inside the curtain wall to outside the curtain wall. A single drainage vent 1 is visible in FIG. 1. Typically any curtain wall according to the principles of the present disclosure will comprise a plurality of the drainage vents 1. The drainage vent 1 comprises a fluid flow path 3. The fluid flow path may be defined by a passage, a channel, or otherwise. An opening for the fluid flow path 3 is provided in the outer face of the curtain wall, which outer wall, as discussed above, is at least partially defined by the infill panels 16. The drainage vent 1, as shown in FIG. 1 and discussed in greater detail below, may project from the outer face 17, although this need not be the case. The curtain wall may comprise an upper edge and a lower edge (not shown), in which case the opening is preferably provided intermediate the upper edge and the lower edge.

The outer face 17 provided with the opening may extend substantially vertically, as in the arrangement of FIG. 1. This may not be the case, particularly if the curtain wall is applied to a building of varied or complex shape. In such cases it may be arranged at an angle to the vertical. The outer face 17 provided with the opening may be an outermost face of the curtain wall. This will again be dependent on the form and/or structure of the curtain wall. In some arrangements, such as that shown in FIG. 1, in which the infill panels 16 are co-planar to one another, the outer face 17 extends substantially parallel to the infill panels 16 (and is substantially co-planar with the infill panels 16). This may not be the case in arrangements in which the infill panels 16 are other than co-planar.

Figure 2:
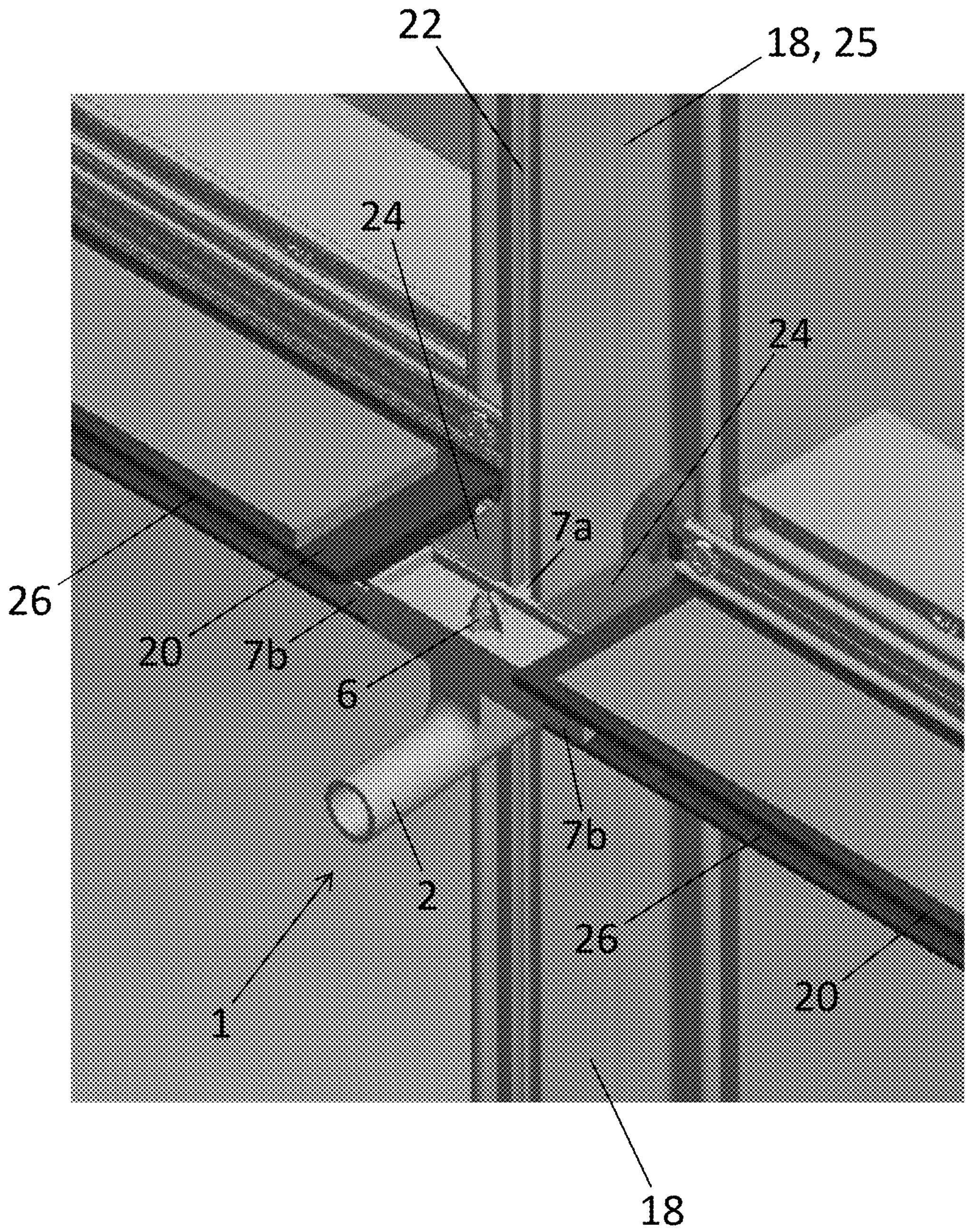
FIG. 2 is a partial front perspective view of the section of curtain wall shown in FIG. 1, in which the infill panels are removed to expose an exemplary arrangement for the drainage vent and a drainage seal.
Figure 3:
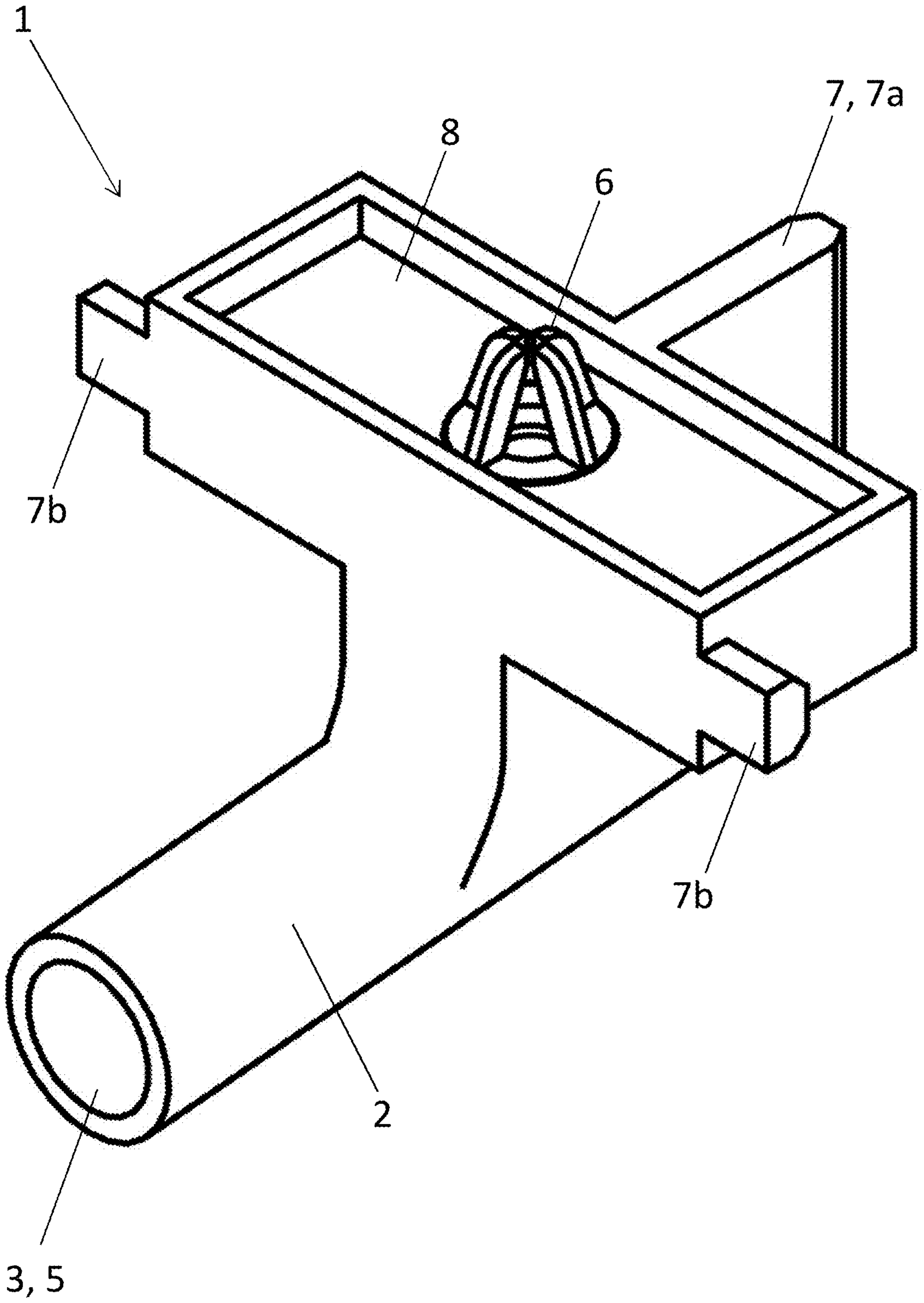
FIG. 3 is a perspective view of the exemplary drainage vent shown in FIG. 2.
Figure 4:
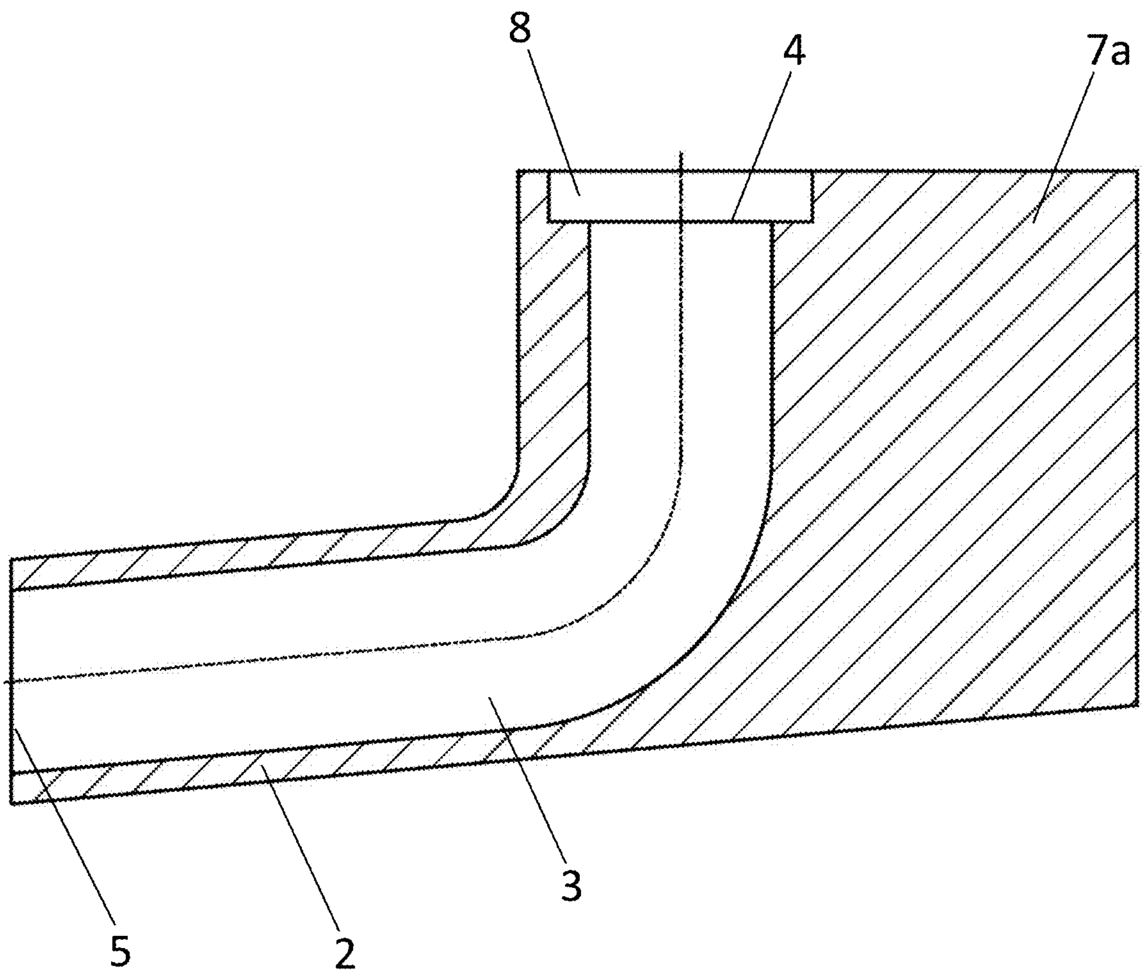
FIG. 4 is a sectional side view of the drainage vent of FIG. 3 with the valve omitted.
Figure 5:
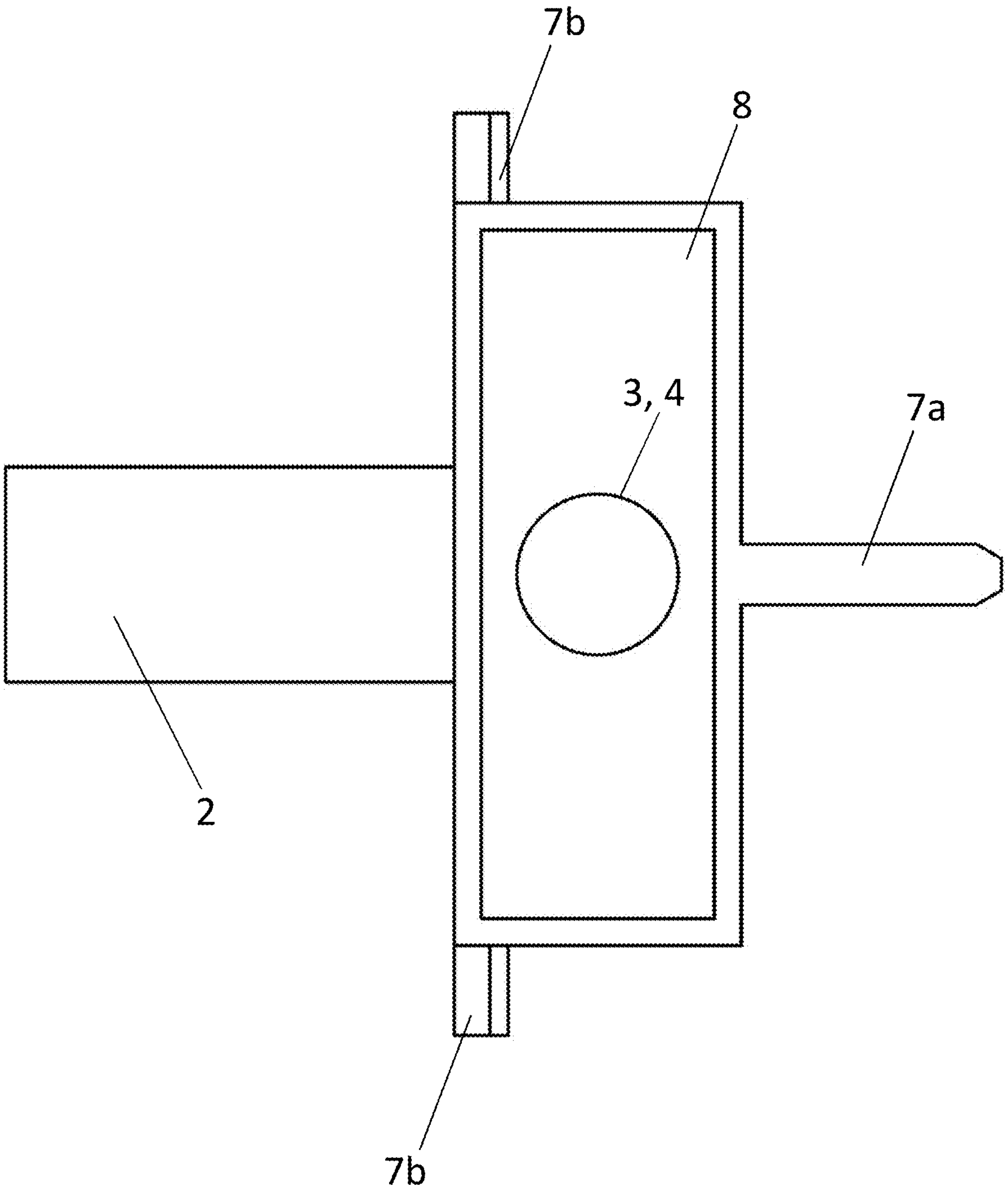
FIG. 5 is a top view of the drainage vent of FIG. 3 with the valve omitted.
Figure 6:
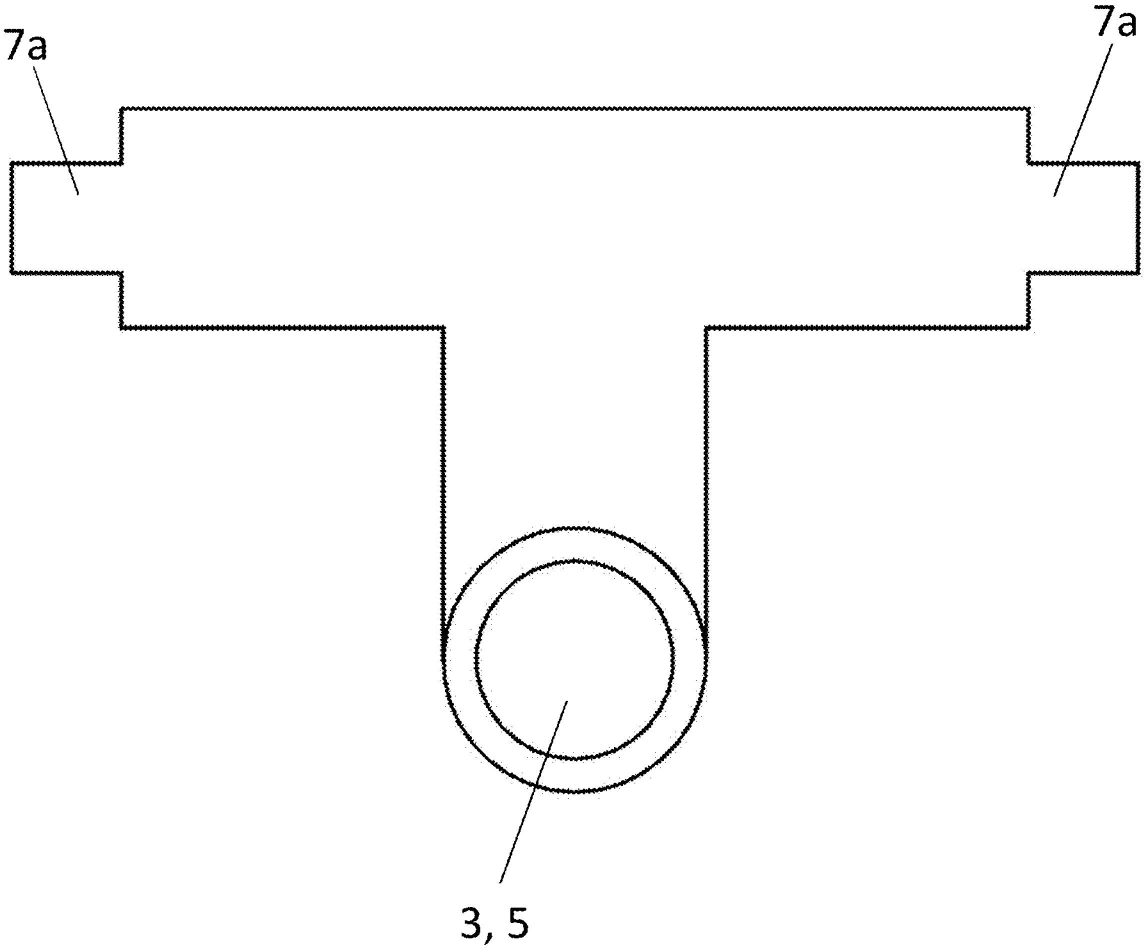
FIG. 6 is front view of the drainage vent of FIG. 3 with the valve omitted.
Figure 7:
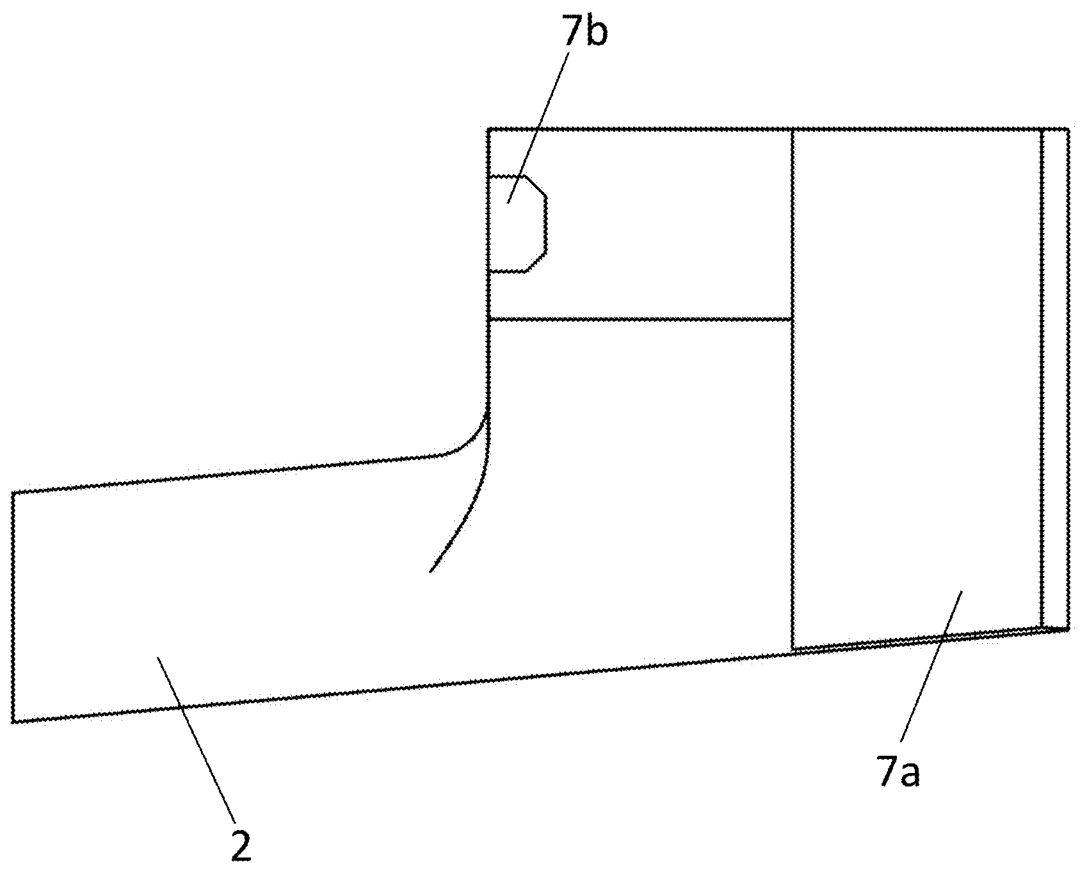
FIG. 7 is a side view of the drainage vent of FIG. 3 with the valve omitted.

The drainage vent 1 and its incorporation into the curtain wall 10 will now be considered in greater detail with particular reference to FIGS. 2 to 7 that show an exemplary and non-limiting arrangement. The drainage vent 1 is most clearly shown in FIG. 3. It is shown in situ in FIG. 2, wherein FIG. 2 shows an enlarged view of a junction between one of the vertical members 18 and two of the horizontal members 20 of FIG. 1 at which the drainage vent 1 is located. In FIG. 2 the infill panels 16 have been removed. FIGS. 4 to 7 show views of the drainage vent 1 with a valve 2, discussed below, omitted.

It is to be noted that whilst the drainage vent 1 is shown in FIGS. 1 and 2 to be installed at a junction between vertical and horizontal members 18, 20, it need not be located as such. It could, for example, be mounted at a point intermediate the junctions. Moreover, it may be adapted for mounting at a junction where a single horizontal member 20 meets a vertical member 18, rather than a junction at which a vertical member 18 is met by two horizontal members 20.

The mounting of the drainage vent 1 may further depend upon the specific structure of the curtain wall 10, which, in line with the discussion above, may be varied from the form shown. In such case the form of the drainage vent 1 will be amended accordingly.

Irrespective of the mounting position of the drainage vent 1, the vertical members 18 may comprise drainage channels 22, as shown, by way of example, in FIG. 2. The drainage channels 22 may be formed in infill support tongues 25 of the vertical members 18, as shown. They may be otherwise formed, as will be readily appreciated by those skilled in the art. The arrangement of any drainage channels will again depend on the specific structure of the curtain wall. In alternative arrangements, for example, any drainage channels may be formed independently of the frame members by the introduction of separate conduits or channels, or by channels that are formed in or between elements of the curtain wall 10 other than the frame members.

There may be one or more drainage seals 24 provided for sealing between the drainage vent 1 and one or more of the frame units 18, 20. It must be noted that drainage seals may not be required. More than this, when present, they may take numerous and varied forms, as will be readily appreciated by those skilled in the art. The depicted arrangement is not limiting.

In the exemplary arrangement of FIGS. 1 and 2, where the frame units comprise horizontal and vertical members 18,20, drainage seals 24 are provided that seal between the drainage vent 1, the vertical member 18 and the horizontal members 20, as clearly shown in FIG. 2. In the depicted arrangement a pair of drainage seals 24 is provided. In alternative arrangements it should be appreciated that more or less drainage seals 24 could be provided. Moreover, one or more drainage seals could be integrally formed with the drainage vent 1 itself. When drainage seals are provided, they are preferably suitably resilient. They may be elastomeric.

The drainage vent 1 may project from the outer face 17 of the curtain wall 10, as shown in FIG. 1. Such projection, whilst not essential, is preferable so as to limit water that drains through the drainage seal 1, running down the outer face 17 of the curtain wall and/or down the infill panels 16. To facilitate the projection, the drainage vent 1 may, for example, comprise a spout 2 that projects through the opening. The spout 2 preferably projects to a point beyond an outer face 17 of the infill panels 16.

The drainage vent 1 comprises a fluid flow path 3 extending therethrough. The fluid flow path 3 may take any suitable form. It may be substantially closed, other than its ends, or it may be substantially open. It may comprise a passage, as in the depicted arrangement. It may be curved or bent or may be straight. It may, in some arrangements, have only a nominal length. The fluid flow path 3 preferably extends between a first opening 4 inside the curtain wall and a second opening 5. The second opening 5 is preferably lower than the first opening 4 for aiding in drainage under the effect of gravity. The fluid flow path 3 may slope down towards the second opening 5. The second opening 5 may, for example, be provided at the outer face of the curtain wall or may be provided outside the curtain wall. When the drainage vent 1 comprises a spout 2, the second opening 5 is preferably provided at the end of the spout 2 outside the curtain wall.

The drainage vent 1 may comprise an open top. It may comprise a recess 8, in the form or a trough or otherwise, for the collection of water to be drained through the fluid flow path 3. The recess may be omitted. The recess, when present is not limited in form. When there are drainage seals 24 present, a base of the recess 8 may be below an upper surface of the drainage seal(s), as seen in FIG. 2. This need not be the case, however.

A valve 6 is preferably provided for controlling fluid flow through the fluid flow path 3. The valve 6 is preferably configured to be normally open to permit the flow of water and/or air through the flow path in a first direction between the first opening 4 and the second opening 5 and to permit the flow of air through the flow path in an opposed second direction between the second opening 5 and first opening 4. The valve is preferably configured to close as a result of fluid pressure in the second direction and to thereby prevent the flow of fluid (air and/or water) through the flow path 3 in the second direction.

Whilst not essential, the provision of a valve is preferable to prevent the ingress of water. The wind is not a constant force, causing both pressure and depression. Pressure exerted by the wind will close the valve 6, wherein the closed valve 6 will prevent any rain water from passing through the drainage vent 1 in the second direction.

The valve 6 in the depicted arrangement comprises a ball valve. It need not be limited as such. It could, for example, comprise a flap valve or otherwise. The form of the valve may be selected in dependence on the form of the drainage vent 1 and operational requirements. Considering operation of the exemplary ball valve 6, when the wind drops, the valve will decompress and the ball will descend under gravity to maintain fluid flow path 3 open. With the fluid flow path 3 open, water may exit the curtain wall 10 through the drainage vent 1 and air may enter and exit the curtain wall 10 through the drainage vent 1 for pressure equalisation of the curtain wall 10.

It is preferable that the frame units 18, 20 comprise slots 22, 26. As discussed above, the slots 22 are useful as a possible drainage channel within the curtain wall. The slots 22 alone, or in combination with the slots 26, are also useful for locating/mounting the drainage vent 1, as exemplarily shown in FIG. 2. For such purposes, it is preferable that the drainage vent 1 comprises one or more projections extending therefrom for receipt by the slot(s) 22, 26 for locating the drainage vent. The projections 7 may comprise tabs, as shown. The form of the projections 7 is not to be limited to the form shown. The projections 7 may be varied, for example, in dependence on the specific structure of the curtain wall. In the present arrangement, in which the frame units comprise vertical members 18 and horizontal members 20, the drainage vent may comprise a first projection **7*a* for engaging a slot in one of the vertical members 18 and one or more second projections 7*b* for engaging slot(s) 26 in one or more of the horizontal members 20. In the arrangement of FIG. 2, the horizontal frame units 20 comprise horizontal glazing supports attached thereto in which the slots 26 are provided. It should be noted that this represents one exemplary arrangement only. The slots 26 may be arranged differently. In particular, in dependence on the specific arrangement of the frame members, which may be varied in numerous ways, as will be readily appreciated by those skilled in the art. There are two of the second projections 7***b* provided in the present arrangement due to the drainage vent 1 being mounted at a junction where a vertical member 18 meets a pair of horizontal members 20. The drainage vent 1 may be adapted for mounting at a junction where a vertical member 18 meets a single horizontal member 20, wherein only a single of the second projections would be provided. Numerous further modifications will be readily conceived by those skilled in the art.

By the provision of one or more of the novel drainage vents 1 and their ability to drain/vent through an outer face 17 of the curtain wall 10, at positions as desired, highly effective drainage and pressure equalization is achieved in a unique and cost effective manner. The curtain wall 10 may be scaled as desired.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

The invention claimed in:

1. A curtain wall for a building comprising:

a frame anchored to the building and including a plurality of frame units, each frame unit including at least one horizontal member defining a lateral slot and at least one vertical member defining a vertical slot;

infill panels supported by the plurality of frame units and at least partially defining an outer face of the curtain wall;

at least one drainage vent for venting fluid from inside the curtain wall to outside the curtain wall, the drainage vent defining a fluid flow path extending between a first opening inside the curtain wall and a second opening outside the curtain wall, and further defining opposing first and second sidewall ends, and opposing front and back sidewalls extending between the first and second sidewall ends, wherein a first projection extends into the curtain wall and vertically from the back sidewall to be received within the vertical slot, and opposing second and third projections extend laterally from the opposing first and second sidewall ends, respectively, to be received within the lateral slot on opposing sides of the drainage vent; and a ball valve arranged within the flow path and including a ball that descends under gravitational force to open the flow path when fluid pressure of wind outside the curtain wall drops, and closes the flow path when the wind increases, wherein the second opening is provided in the outer face of the curtain wall, and wherein the opposing first and second sidewall ends and the opposing back and front sidewalls collectively define a recess for the collection of water, and the first opening is provided within a base of the recess.

2. The curtain wall as claimed in claim 1, wherein the curtain wall comprises an upper edge and a lower edge and the opening is provided intermediate the upper edge and the lower edge.

3. The curtain wall as claimed in claim 1, wherein the drainage vent is provided at or adjacent to a junction of the vertical member and the horizontal member.

4. The curtain wall as claimed in claim 3, wherein the vertical member defines a drainage channel that feeds at least a portion of the fluid to the drainage vent.

5. The curtain wall as claimed in claim 1, wherein one or more drainage seals are provided for sealing between the drainage vent and one or more of the frame units.

6. The curtain wall as claimed in claim 1, wherein the drainage vent comprises a tubular spout having a circular cross-section that projects through the opening.

7. The curtain wall as claimed in claim 6, wherein the spout projects to a point beyond an outer face of one or more of the infill panels.

8. The curtain wall as claimed in claim 1, wherein the valve is configured to be normally open to permit the flow of water and/or air through the flow path in a first direction between the first opening and the second opening and to permit the flow of air through the flow path in an opposed second direction between the second opening and first opening.

9. The curtain wall as claimed in claim 8, wherein the valve is configured to close as a result of fluid pressure in the second direction and thereby prevent the flow of fluid through the flow path in the second direction.

10. The curtain wall of claim 5, wherein the one or more drainage seals comprise a drainage seal arranged between the drainage vent and a portion of the horizontal member, and further arranged between the drainage vent and a portion of the vertical member.

11. The curtain wall of claim 10, wherein the drainage seal comprises a first drainage seal arranged on a first side of the vertical member, and wherein the one or more drainage seals further comprises a second drainage seal arranged on a second side of the vertical member opposite the first side.

12. The curtain wall of claim 10, wherein the drainage vent further includes a front sidewall opposite the back sidewall and extending between the first and second sidewall ends, and wherein the opposing first and second sidewall ends and the opposing back and front sidewalls collectively define a recess for the collection of water, and the first opening is provided within a base of the recess.

13. The curtain wall of claim 1, wherein the at least one drainage vent comprises a body that includes the opposing first and second sidewall ends and the back sidewall, and further includes a front sidewall opposite the back sidewall and extending between the first and second sidewall ends, and wherein the opposing first and second sidewall ends and the opposing back and front sidewalls collectively define a recess for the collection of water, and the first opening is provided within a base of the recess.

14. The curtain wall of claim 1, wherein the first projection extends perpendicular to the second and third projections.

15. The drainage vent of claim 1, wherein the recess is vertically offset from the second opening.

16. A drainage vent for a curtain wall, comprising:

a body including opposing first and second sidewall ends and opposing front and back sidewalls extending between the first and second sidewall ends;

a fluid flow path extending between a first opening inside the curtain wall and a second opening outside the curtain wall;

a first projection extending vertically from the back sidewall and receivable within a vertical slot defined in a vertical member of the curtain wall;

opposing second and third projections extending laterally from the opposing first and second sidewall ends, respectively, and receivable within corresponding lateral slots defined between vertically adjacent horizontal members of the curtain wall; and a ball valve arranged within the flow path and including a ball that descends under gravitational force to open the flow path when fluid pressure of wind outside the curtain wall drops, and closes the flow path when the wind increases, wherein the second opening is provided in the outer face of the curtain wall, and wherein the opposing first and second sidewall ends and the opposing back and front sidewalls collectively define a recess for the collection of water, and the first opening is provided within a base of the recess.

17. The drainage vent of claim 16, wherein the first projection extends perpendicular to the second and third projections.

18. The drainage vent of claim 16, wherein the recess is vertically offset from the second opening.

* * * * *